Oct. 2, 1951

P. A. MARSELL ET AL 2,569,484

APPARATUS FOR COATING SHEET MATERIAL
WITH PARTICULATE MATERIAL

Filed Nov. 3, 1947

Inventors:
Philip A. Marsell and
Charles H. Teller
By Frank H. Wisch
Attorney

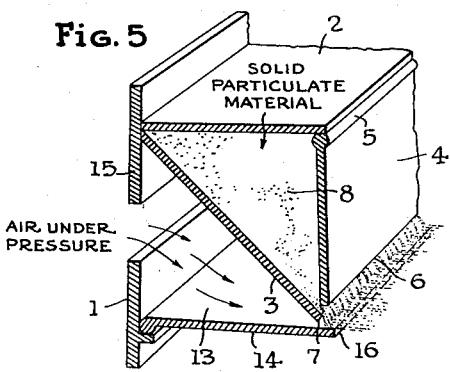
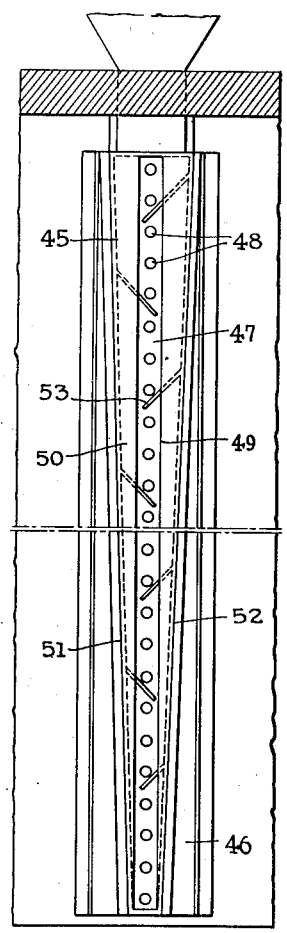
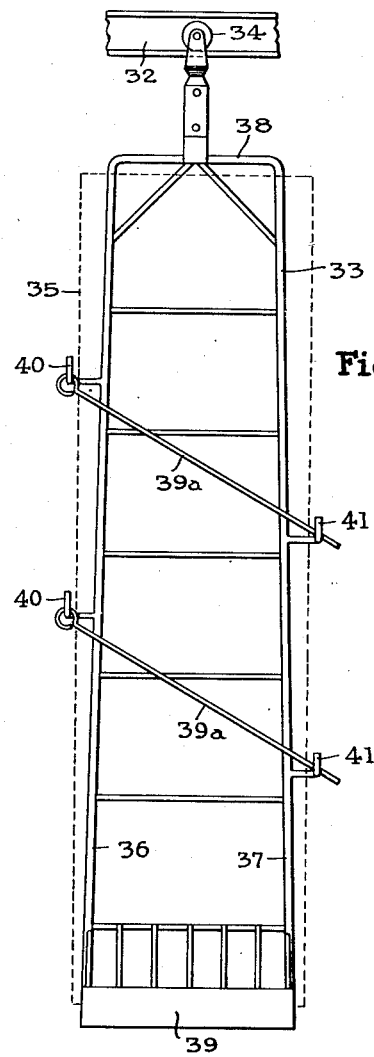

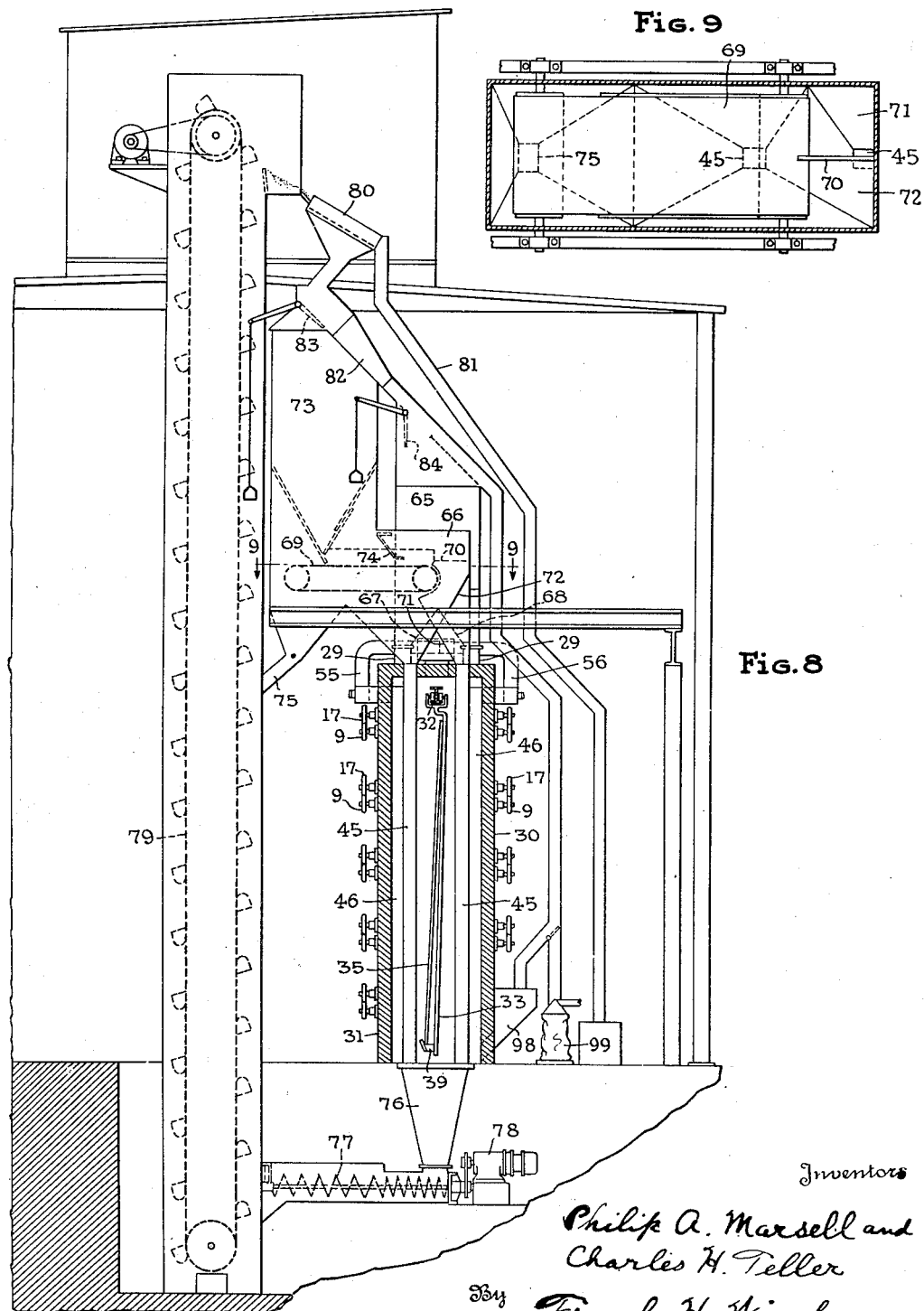

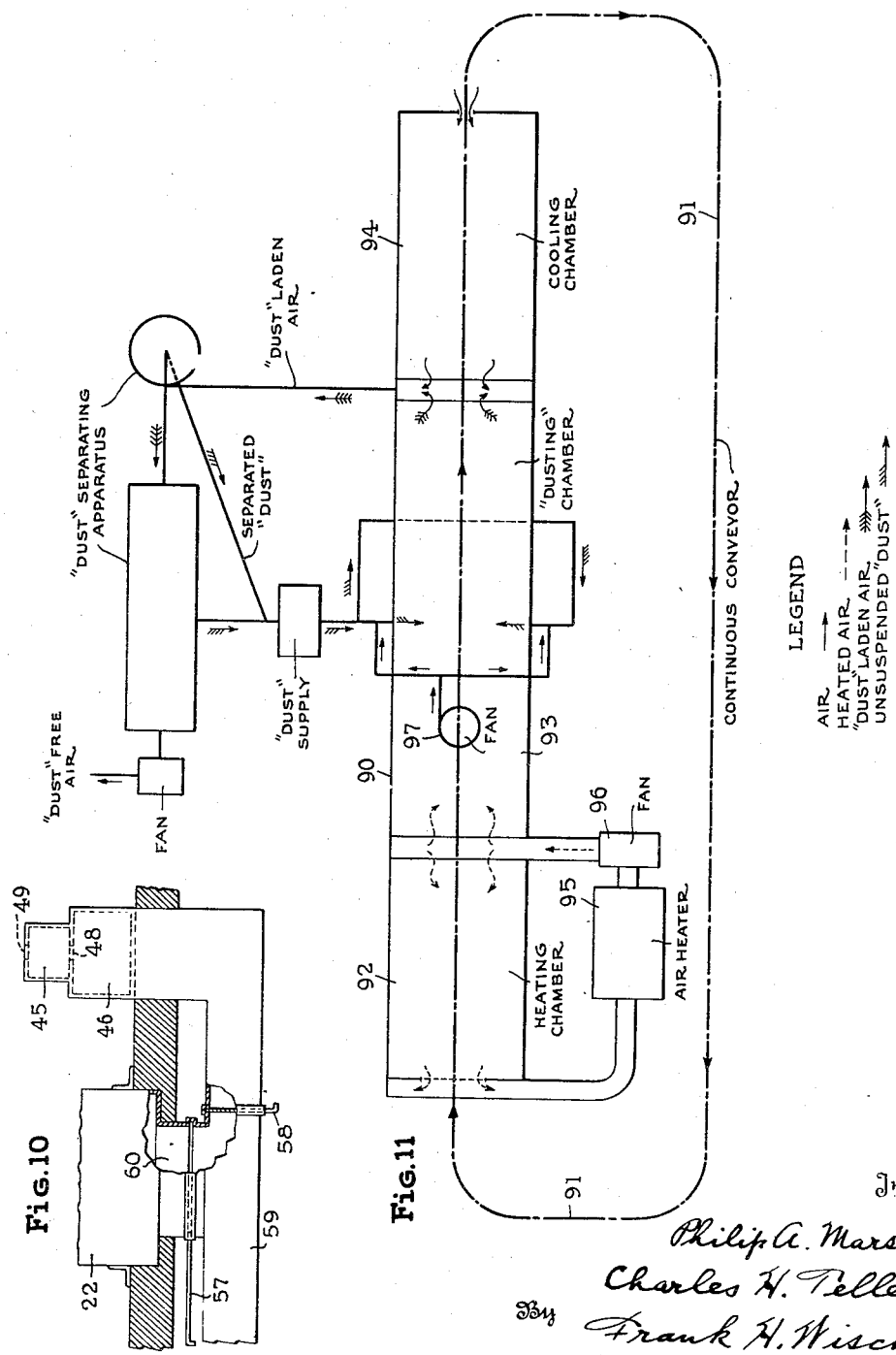

Patented Oct. 2, 1951

2,569,484

UNITED STATES PATENT OFFICE 2,569,484

APPARATUS FOR COATING SHEET MATERIAL WITH PARTICULATE MATERIAL

Philip A. Marsell, Emsworth, and Charles H. Teller, Mount Lebanon, Pa., assignors to Koppers Company, Inc., a corporation of Delaware Application November 3, 1947, Serial No. 783,710

4 Claims. (Cl. 91—45)

This invention relates to improvements in methods of and means for applying solid particulate material to surfaces to be coated therewith. More particularly the invention relates to conveyance of such material and uniform distribution thereof on said surfaces to provide articles uniformly coated with the particulate material.

Various means have been employed prior to the present invention, whereby surfaces have been coated with solid particulate materials such as granules, dusts, or aggregate. Such surfaces have been precoated with an adhesive bonding material and thereafter granules have been projected or dropped onto the precoated surfaces. For large scale production, hand sprays have been more or less inefficient and inadequately effective in uniformly distributing the granules. Mere dropping of granules on an adhesive coated object causes too close packing and in most instances there is insufficient force to cause proper sticking and embedding. The use of rolls to press the granules into an adhesive coating has not proved practical particularly for such objects as corrugated sheets or other articles with irregular surfaces.

In many suggested means for coating sheet materials, for instance, only one side of a sheet is coated at a time and some particular means are frequently required to provide, with somewhat complex or sensitive mechanisms, a turbulent suspension or stream of particles, and means for removing excess granules. Also, usually, a single means is provided for applying particulate material without regard to the characteristics of the particles of such material.

The present invention provides means for overcoming various difficulties of the prior art.

An object of this invention is to provide improvements in methods of and means for applying solid particulate material to surfaces to be coated therewith. Another object is to provide improved methods and means whereby, in a continuous production of coated articles, such surfaces are uniformly coated over their entire areas with solid particulate material. A further object is to provide relatively simple means for bringing into adhesive engagement with sheets or boards of extensive area, solid particulate material and to coat the entire area uniformly with said material. An object is also to provide improved means for selectively applying solid particulate material of different specific gravities and varying as to other characteristics.

In the invention to be described more particularly below, as applied to coating of sheets or boards, the articles to be coated with solid particulate material are precoated with an adhesive layer or film to provide a bonding means for the solid particles. The entire surface of the precoat is preferably maintained uniformly sticky while the articles are conveyed in succession, continuously or intermittently, through an enclosure past improved means for applying solid particulate matter in a manner whereby the particles are made to cover the sticky surface uniformly. In said improved means, particles are initially permitted to fall vertically and are then forcibly diverted in a horizontal direction, in a suspension of uniform concentration, toward an adhesive coated surface passing across the path of said particles.

Solid particulate material employed includes granules or aggregate of any suitable size in the range of about 10 to 100 mesh and preferably 10 or 20 to 40 or 50 mesh. The particles of the material have surfaces which have any one or more of the following characteristics: curved and shell-like, flat, aproximately even planes, very uneven, rough, or irregular. The granules may be made up of natural granules, artificially colored granules, synthetic granules or mixtures of granular substances. Materials most commonly used are slate, greenstone, chert, flint, quartzite, rhyolite, quartz sand, quartz river gravels, limestone, feldspar, granite, ore tailings, slag, shale, crushed brick and tile, mica, talc, and foliated talc. Asbestos fiber, paper stock, abrasive dusts, organic dusts, and metal powders may also be employed.

Further details of the present invention are described hereinbelow and are shown in the accompanying drawings in which:

Fig. 5 is a perspective view of a fragment of said element;

Fig. 6 is a front elevational view of another element in said means;

Fig. 7 is a side elevational view of a carrier means or rack for sheets to be coated with particulate material;

Fig. 8 is an elevational view, partly in section, of a plant arrangement in which selective application of particles to sheets is made possible;

Fig. 9 is a horizontal section of a portion of the apparatus shown in Fig. 8, taken on line 9—9;

Fig. 10 is an enlargement of a portion of the view of the apparatus shown in Fig. 2; and Fig. 11 illustrates diagrammatically the operation of one type of plant in which the said means are employed.

Similar parts of the apparatus are designated by the same reference characters in the various figures.

Figure 1:
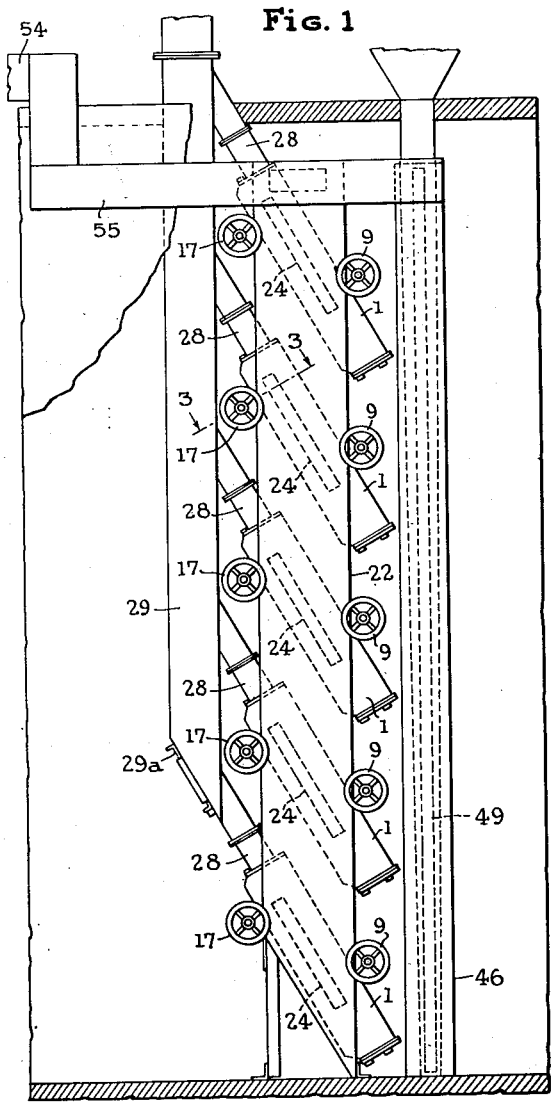
Fig. 1 is a side elevational view of means for applying solid particulate material to sheets.

Referring to Figures 1 to 5, there is shown an elongated receptacle 1 for solid particulate material. The receptacle has means whereby the particulate material may be discharged therefrom in a vertically descending, curtain-like stream and means for controlling the thickness of said stream. In the receptacle shown, a rigidly positioned top 2 and a rigidly positioned bottom 3 transversely inclined (Fig. 5) toward a side wall 4 functioning as an adjustable gate, serve as means for providing the above-described stream. The upper edge 5 of the side 4 is hinged to permit the movement of its lower edge 6 toward or away from the bottom 3. When the side wall or gate 4 is closed, the edge 6 is in the plane of the surface of the bottom 3 and adjacent the lower edge 7 thereof. When the edge 6 is seated on or held tightly against the bottom, the particulate material 8 is maintained in the receptacle 1.

Adjustable means provided for controlling the thickness of the stream of particulate material flowing out of the receptacle 1 on opening the gate 4, comprises a handwheel 9 mounted on a yoke 10 and in threaded engagement with a rod 11 longitudinally movable by turning the handwheel. The rod 11 operates a lever 12 which in turn operates the gate 4.

Upon opening the gate 4 an outlet slot for particulate material is formed which permits the material to fall by gravity over the edge 7 of the bottom 3. Means are provided for directing the particulate material, substantially at the beginning of the formation of a curtain-like stream, towards a surface to be coated with said material, which surface is moved horizontally or vertically across the path of the projected particles. An air-blast is employed for so projecting the particles. A compressed air compartment 13 is positioned beneath the inclined bottom 3 which forms the upper wall of said compartment. The lower wall of the air compartment 13 is a flap or adjustable gate 14 hingedly engaging a supporting wall 15. The flap 14 is coextensive with the edge 7 and is adapted to be seated thereon when in closed position. When in open position an air slot is formed beneath the edge 7 that is substantially coextensive with the outlet slot for particulate material, whereby an air-blast can be directed across the width of the descending stream of said material. The edge 16 of the flap or air gate 14 is preferably positioned beyond the vertical path of the particulate material so that particles reaching the surface of this flap can at least be momentarily retained in the path of the blast and can be swept thereby toward a surface to be covered.

Adjustable means are provided for controlling the width of the air slot. Such means comprise a handwheel 17 mounted on a yoke 18 and in threaded engagement with a rod 19 longitudinally movable by turning said handwheel 17. The rod 19 is linked with one end of an arm 20. The other end of this arm is attached to the flap or air gate 14.

Stiffener rods 21 aid in supporting and in maintaining the inclined bottom 3 and the wall 2 rigidly in place.

Air is blown under pressure into the compartment 13 from an air flue 22 through an opening 23 in the wall 15, which registers with an opening 24 in the flue 22. The air flue 22 and the receptacle 1 with its associated means are mounted on the vertical wall 25 of an enclosure or housing in which solid particulate material is applied to a sheet.

Though a sheet may be moved vertically in the path of particulate material projected from a receptacle 1, it is found highly convenient and effective to convey such sheet in vertical position horizontally past a plurality of such particle-applying means arranged in a manner to be described and as shown in Fig. 1. In such instances, the receptacle 1 may be considered as an inclined chute closed at its lower end by a removable plate 27. The angle of such chute with the horizontal is preferably greater than the angle of repose or angle of friction of the particulate material used.

The receptacles 1 are shown in Fig. 1 as parallel extensions of inclined, branch chutes 28 depending from a main vertical chute 29 provided at its lower end with a clean-out door 29a. The branch chutes are vertically spaced apart, and each of a plurality of diagonally arranged air outlets 24 in the vertical air flue 22 is connected to an air compartment 13 of a granule-applying unit embodying the receptacle 1. It is readily seen that with the receptacles 1 in the position shown, the solid particulate material is projected substantially horizontally in a plurality of inclined, substantially parallel planes or strata, vertically spaced apart. The planes of projected particles extend toward the face of a sheet while being coated, and the particles impinge in strata extending diagonally across the face. The units 1 are so positioned that the particles in the lower edge of each stratum above the lowermost stratum are below the particles in the upper edge of the next subadjacent stratum. In other words the particles are applied to the surface of a sheet in overlapping zones as the surface is moved horizontally across the paths of the projected particles.

Figure 2:
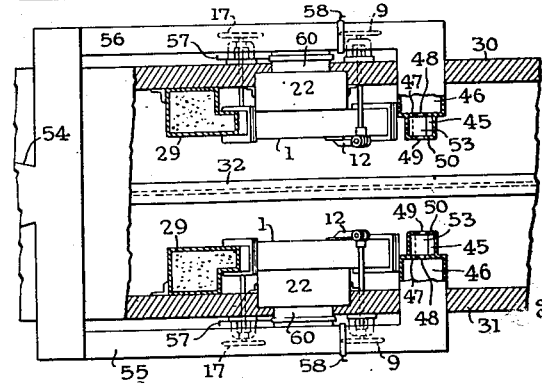
Fig. 2 is a top view of such means, partly in section.

As shown in Figs. 2 and 8, in the coating of articles such as sheets, on both sides, the particle-applying units in the arrangement shown in Fig. 1, may be placed on either side of an article in a housing having side walls 30 and 31, and a track 32 running midway between the walls at the ceiling. A rack 33 (Fig. 7) suspended from a roller 34, movable along the track 32, is provided for carrying an article such as a sheet 35.

The rack 33 comprises a trapezoidal frame having side bars 36 and 37, and tapering from the lower end to a top cross bar 38. Bracket means 39 at the lower end of the frame serves to support the lower edge of a sheet 35, under treatment, spaced from the plane of the side bars 36 and 37 so that the sheet may lean with its upper end against the frame, as shown in Fig. 8. Metal rods 39a, each having one end hinged to an arm 40 on one side bar 36, and the other end resting on an arm 41 on side bar 37, are brought across the free side of a sheet, to keep the sheet from being accidentally pushed from a rack when it is being moved on the track 32. On this rack a sheet is practically completely exposed to impingement by particulate material on both sides.

Figure 3:
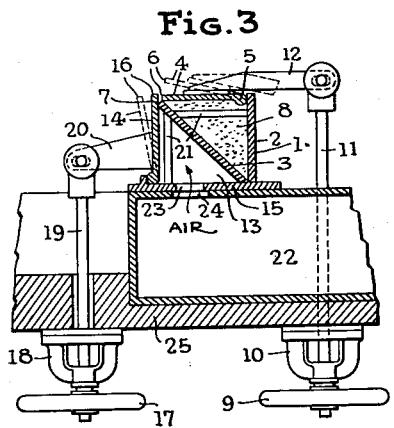
Fig. 3 is a sectional view of a fragment of said means taken on line 3—3 of Fig. 1, in the direction of the arrows.
Figure 4:
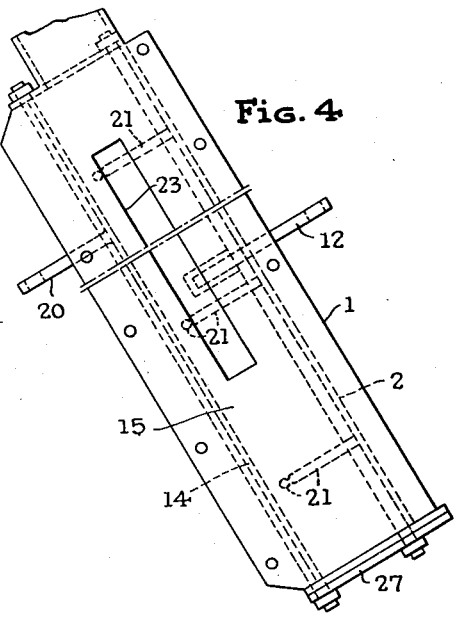
Fig. 4 is a rear view of an element in said means.

In the coating of sheets with solid particulate material, it is found advantageous to employ one of two types of means depending upon the specific gravity and structure or other characteristics of the particles of such material. In the application of heavier materials, such as slate particles for instance, the use of the means shown in Figs. 3, 4 and 5 is preferred. In the application of lighter materials, especially when the particles are fluffy, or leafy, or show a tendency to float in or to remain in suspension in air, or are likely to pack in chutes, it is preferred to use a means shown in Figs. 1, 2, 6, and 8.

The last named means includes a chute 45 for particulate material associated with an air flue 46. This means may be placed as shown in Fig. 2, on either side of the track 32 within the walls 30 and 31 of the enclosure, and adjacent the receptacles 1. Substantially throughout its height within the enclosure, the wall 47 of the flue 46, facing the path of a sheet conveyed on the track 32 through the enclosure, is provided with a plurality of small openings 48 uniformly spaced one above the other. The chute 45 is fastened to the wall 47 of the flue 46 and is provided with a slot 49 in a wall 50 opposite the wall 47. The slot 49 extends vertically substantially the entire length of the chute 45 inside the enclosure, and is slightly wider than the diameter of the openings 48. The centers of the openings 48 and the center line of the slot 49 are in a plane substantially perpendicular to the line of travel of a sheet under treatment in the enclosure. Particles of the particulate material are projected in this plane by an air blast in the flue 46 through the openings 48.

The width of the upper end of the chute 45 is substantially the width of the flue 46. The side walls 51 and 52 of the chute 45, as they extend downwardly, converge so that at the bottom of the enclosure the distance between these walls is substantially the width of the slot 49. The width of the flue 46 is substantially uniform throughout its height in the enclosure. The convergence of the walls 51 and 52 tends to maintain the particles of particulate material passing down the chute 45 at about the same concentration throughout the height of this chute. In other words, it is made possible to provide a uniform dispersion or suspension of particles adjacent the entire surface of a sheet as it passes in front of the slot 49.

Baffles 53 are provided in the chute 45 to break the fall of the particles of particulate material and thus decrease their vertical velocity so that they are more readily forced horizontally toward a sheet. The baffles 53, as shown in Fig. 6, extend partly across the chute 45 at intervals alternately from the walls 51 and 52. They are inclined downwardly from said walls, and the free edge of each is positioned just past, or substantially at, the center line of the slot 49. When the particulate material employed consists of particles of a light flaky material, such as mica, or material of relatively low density such as certain fibrous substances, the baffles are not essential. In such instances, the baffles may be omitted as indicated in Fig. 10.

In the use of the above two types of means for applying particulate material to both sides of a sheet, the air and particle outlets of such means on one side of the line of travel of a sheet are preferably substantially the same distance from said line as the air and particle outlets, respectively, of a corresponding means on the other side of said line, as shown in Fig. 2.

The flues 46 and the flues 22 on either side of the enclosure are connected at their upper ends to a common duct 54 by branch ducts 55 and 56 through which air or other gaseous fluid pass under pressure. To stop or permit passage of air selectively to one or another of the particle-applying means, slide valves 57 and 58 are provided. These are shown in enlargement in Fig. 10 in which the flue connections are indicated for particle-applying means on one side of the enclosure. An air duct 59 is connected to the top end of the flue 46. The slide valve 58 is employed to regulate the supply of air from the duct 59 into the flue 46. A duct 60 connects the duct 59 to the top end of the flue 22. The slide valve 57 situated in the duct 60 regulates the supply of air from the duct 59 into the flue 22, to which the particle-applying means shown in Figs. 3, 4 and 5 is connected.

For selectively feeding the chutes 45 and the receptacles 1 with particulate material, means are provided such as that shown in Figs. 8 and 9. The chutes 29 extend downwardly from the bottom of a hopper 65. The chutes 45 extend downwardly from the bottom of a hopper 66. The bottom of the hopper 65 is provided with inclined walls 67 and 68 positioned to direct particulate material into the chutes 29 on both sides of the enclosure within the walls 30 and 31. A belt conveyor 69 in association with a dividing wall 70, and inclined walls 71 and 72 in the bottom of hopper 66 distribute particulate material to the two chutes 45. Positioned above the conveyor 69 is a hopper 73 for feeding particulate material to the conveyor. Particulate material on the conveyor is levelled by means of a levelling means 74, as the material is moved to the right. A chute 75 is provided for spillage.

Means are provided for continuously circulating the particulate material from the enclosure in which the material is applied to the sheets, to the selected hopper. A pit 76 is positioned beneath the enclosure to collect excess particulate material that does not adhere to a sheet. A screw conveyor 77 driven by a motor 78 passes the material from the bottom of the pit 76 to a bucket conveyor 79 which raises the material to a level above the hoppers 65, 66 and 73.

From the bucket conveyor the particulate material is dumped on an inclined vibrating screen 80. Any material retained on the screen is discarded through a chute 81. Material passing through the screen runs into a feed chute 82 from which it is selectively fed to the hopper 73 or the hopper 65. A gate 83 when opened permits material to fall from the chute 82 into the hopper 73. A gate 84 when opened permits material to fall from the chute 82 into the hopper 65. The single chute 82, therefore, serves to feed selectively one or the other of the types of particulate material adapted to be employed in the two particle-applying means in the enclosure in which a sheet is coated.

In the coating of sheet material with solid particles of substances indicated hereinabove, a sheet is first coated with a film or layer of a composition that will serve to bind the particles to the surface. Such a composition may be a glue or an adhesive, including a synthetic or natural resin-containing material, a bitumen-containing material, or the like, which may be applied by spraying, brushing, or dipping. This precoating may be thermoplastic or thermosetting and may be applied as a solution from which the solvent may be evaporated, or as a hardenable molten, substance.

Fig. 11 serves as a flow diagram to illustrate a plant and its operation, in connection with the improved means described, for uniformly coating sheets with solid particulate material. In such a plant it is assumed that a metal, wooden or composition sheet material either corrugated or flat and suitable for siding or roofing in building or other structures, is precoated with a bituminous or other coating that can be rendered soft or sticky by heat.

In such instance, the precoated sheets are passed through an elongated tunnel 90 on a continuous conveyor 91 comprising an overhead track from which are hung racks such as illustrated in Figs. 7 and 8. A sheet is supported on its end in a substantially vertical position on a rack and is passed successively through a heating section or chamber 92 in said tunnel, a section or chamber 93 (also termed a "dusting chamber") in which solid particulate material is applied, and a cooling section or chamber 94. The courses of the various air currents are indicated by arrows explained in the legend.

The precoated sheet is heated uniformly over the entire coated surface in the chamber 92 by a current of air heated in a furnace 95 and kept in circulation by a fan 96 to render the surface preferably uniformly sticky, as in a manner set forth, for instance, in a U. S. patent application of M. I. Dorfan, Serial No. 708,096, filed November 6, 1946, now Patent 2,536,042. As further illustrated in said application, the surface is maintained sticky over its entire area in the "dusting" chamber 93 by circulation of heated air therethrough, and after applying the "dust" (solid particulate material) the sheet is cooled by a current of cooling air in chamber 94, to set the coating. The sheets emerging from the chamber 94 are removed from the conveyor 91 in substantially finished form.

"Dust" laden air from the chamber 93 may be treated to recover the "dust" by means of apparatus diagrammatically illustrated in the above Fig. 11, and shown in detail in the above application.

In applying the "dust," hot air may be used to project the particles onto a thermoplastic surface. Hot air will tend to preheat the particles so that they may more readily penetrate the surface of a thermoplastic coating. Such air may be withdrawn from the roof of chamber 93 by a fan 97, and by said fan forced into the above-described particle-applying means.

For coating sheets placed in vertical position and moving horizontally through an enclosure in which solid particulate material is applied, the operation of the means shown in Figs. 1, 3, 4, 5 and 8 may be illustrated as follows: Slate particles, for instance, of a desired mesh, are admitted from the hopper 65 into the chutes 29 on either side of the sheet 35 in the enclosure. By keeping the chutes 29 full, the slate is continuously fed into the receptacles 1. The gates 4 are each set, by means of the handwheels 9, to form an open slot through which a constant flow of slate particles is maintained over the edge 7. From this edge the particles drop vertically in a curtain-like stream in which said particles are continuously in substantially uniform concentration throughout its thickness and width in the plane at which the air blast from the compartment 13 strikes the particles and during a period of coating a sheet.

The air blast is fed from the conduit 54 through the connection 60, the valve 57 being open and the valve 58 being closed; thence through the flue 22 and into the compartment 13 of each of the inclined particle-applying means. The blasts from these compartments are regulated by presetting the air gates 14 by means of the handwheels 17. Substantially at the commencement of the vertical descent of the slate particles, a blast is applied with substantially uniform force across the width of a stream, and will project the particles continuously toward the surfaces to be covered. The concentration of particles in the thus projected streams will also be continuously substantially uniform during a given coating operation.

Though the zones on a sheet to which the particles are applied while intercepting the inclined streams from each of the receptacles 1 (as described hereinabove) are overlapping, the sheets nevertheless become uniformly coated. It will be observed in Fig. 1, for instance, that when a sheet is moved from left to right through the projected streams the particles from the lower end of a receptacle 1 will have covered the sheet surface before the particles from the upper end of a next subjacent receptacle reach the sheet. The latter particles are therefore deflected by the particles previously bound to said surface of the sheet.

For the application of a solid particulate material like mica, for instance, the valve 57 is closed, valve 58 is opened and the air blast passes down the flue 46 and horizontally through the openings 48 across the path of falling mica particles. The mica particles are thereby projected toward the surface of a sheet passing through the tunnel 90. The quantity of mica continuously fed to the chutes 45 from the hopper 66 is controlled by the speed of the belt conveyor 69. As previously indicated, the concentration of particles in the chutes 45 is continuously substantially uniform. The concentration of particles in the stream passing through the slot 49 toward a sheet will also be continuously substantially uniform. As the sheet, the surface of which is maintained uniformly sticky over its entire area, is moved through the tunnel 90, it receives a substantially uniform coating of mica.

Particulate material that does not adhere to a sheet drops into the pit 76 from which it is circulated by the conveyors 77 and 79, through the chute 82. Mica particles would drop from the chute 82 into the hopper 73, gate 83 being open and gate 84 being closed. Overflow passes down the chute 82 into a bin 98, or into bags 99. Makeup is also dumped into the bin 98 from which the particles are passed into the pit for circulation in the system. If particles of slate, for instance, are used, the gate 83 is closed and the gate 84 is open to feed the hopper 65.

The invention as hereinabove set forth is embodied in particular form and manner but may be variously embodied within the scope of the claims hereinafter made.

What is claimed is:

1. Apparatus for applying solid particulate material to a surface to be coated therewith and for uniformly distributing said material on said surface, the said apparatus comprising: a receptacle for solid particulate material, having an inclined bottom, an adjustable hinged flap comprising one side of said receptacle and when closed having its lower edge in the plane of the surface of the said bottom and adjacent to and substantially parallel to the lower edge of the inclined bottom, means for adjustably spacing the said lower edge of said flap outwardly from the said bottom of the receptacle to permit the flow of said particulate material out of the receptacle in a curtain-like stream, and means substantially at the level of initial vertical release of the particles of said material for directing an air-blast across the width of said stream to divert the particles to a substantially horizontal path toward a vertical surface to be coated.

2. Apparatus for applying solid particulate material to a surface to be coated therewith and for uniformly distributing said material on said surface, the said apparatus comprising: an inclined chute having a closed end for forming a receptacle for solid particulate material, said receptacle having a bottom wall inclined toward one side of said chute, said side comprising an adjustable hinged flap which, when closed, has its lower edge in the plane of the surface of the said bottom wall and adjacent to and substantially parallel to the lower edge of the said inclined bottom wall, means for adjustably spacing the said lower edge of said flap outwardly from the said bottom wall to form an outlet slot to permit the flow of said particulate material therethrough in a curtain-like stream, a compressed air compartment beneath said bottom wall of said chute, a second hinged flap coextensive with the said lower edge of said bottom wall of said chute and adapted to be seated on said latter edge when in closed position, and means for adjusting the space between said latter edge and the said second flap to form an air slot substantially coextensive with said outlet slot for particulate material whereby an air-blast is directed across the width of the stream of said particulate material and whereby particulate material in said stream is directed toward a vertical surface to be coated.

3. Apparatus for applying solid particulate material to a surface to be coated therewith and for uniformly distributing said material on said surface, the said apparatus comprising: a plurality of substantially parallel, inclined chutes vertically spaced apart and connected to a main chute for feeding solid particulate material to said inclined chutes, each of said inclined chutes having a side comprising a flap having a hinged upper edge whereby the lower edge is movable outwardly for forming a vertically descending curtain-like stream of said particulate material, means adjacent each chute for directing an air-blast in a plane diagonally across the width of the stream of said particulate material to form sprays of said material in a plurality of inclined planes vertically spaced apart, and means for conveying articles to be coated horizontally through said sprays, the said inclined chutes being so spaced that the surface zones on said articles toward which the said material is directed are in overlapped relationship.

4. Apparatus for applying solid particulate material to a surface to be coated therewith and for uniformly distributing said material on said surface, the said apparatus comprising: means for applying solid particulate material of relatively low degree of suspendibility in air to said surface, means for applying solid particulate material having a relatively high degree of suspendibility in air to said surface, and means for selectively feeding particles of said materials to said first-named means and to said second-named means; said first-named means comprising an inclined chute having a side comprising a flap having a hinged upper edge whereby the lower edge is movable outwardly for forming a vertically descending curtain-like stream of said first-named solid particulate material, and means substantially at the level of initial vertical release of the particles of said first-named material for directing an air-blast across the width of said stream to divert the particles to a substantially horizontal path toward a surface to be coated; and said second-named means comprising a vertical chute through which said second-named solid particulate material is freely dropped, the said chute having a vertical slot in a side thereof, and means for directing a blast of air across the path of descending second-named material in the chute through the said slot and onto a surface to be coated.

PHILIP A. MARSELL.
CHARLES H. TELLER.

REFERENCES CITED

The following references are of record in the file of this patent:

UNITED STATES PATENTS

| Number | Name | Date |
|---|---|---|
| 738,347 | Myers | Sept. 8, 1903 |
| 808,236 | Hahn | Dec. 26, 1905 |
| 1,003,441 | Eaton | Sept. 19, 1911 |
| 1,333,079 | Kaufmann | Mar. 9, 1920 |
| 2,034,008 | Taylor | Mar. 17, 1936 |
| 2,169,078 | Waite | Aug. 8, 1939 |
| 2,187,376 | Guibert | Jan. 16, 1940 |
| 2,395,157 | Work et al. | Feb. 19, 1946 |